United States Patent
Hajiaghayi et al.

(10) Patent No.: US 8,606,964 B2
(45) Date of Patent: *Dec. 10, 2013

(54) SYSTEM AND METHOD FOR ASSIGNING REQUESTS IN A CONTENT DISTRIBUTION NETWORK

(71) Applicants: Mohammad Taghi Hajiaghayi, Florham Park, NJ (US); Mohammad Hossein Bateni, Princeton, NJ (US)

(72) Inventors: Mohammad Taghi Hajiaghayi, Florham Park, NJ (US); Mohammad Hossein Bateni, Princeton, NJ (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/653,043

(22) Filed: Oct. 16, 2012

(65) Prior Publication Data
US 2013/0042021 A1  Feb. 14, 2013

Related U.S. Application Data

(63) Continuation of application No. 12/329,454, filed on Dec. 5, 2008, now Pat. No. 8,316,106.

(51) Int. Cl.
*G06F 15/16* (2006.01)
*G06F 15/173* (2006.01)

(52) U.S. Cl.
USPC .................. 709/241; 709/238; 709/219

(58) Field of Classification Search
None
See application file for complete search history.

(56) References Cited

U.S. PATENT DOCUMENTS

| | | | |
|---|---|---|---|
| 6,785,704 B1 | 8/2004 | McCanne | |
| 6,799,221 B1 | 9/2004 | Kenner et al. | |
| 7,339,937 B2 | 3/2008 | Mitra et al. | |
| 7,594,016 B1 | 9/2009 | Zhou et al. | |
| 7,796,607 B2 | 9/2010 | Gerber et al. | |
| 7,797,426 B1 | 9/2010 | Lyon | |
| 8,316,106 B2 * | 11/2012 | Hajiaghayi et al. | 709/219 |
| 2002/0038360 A1 | 3/2002 | Andrews et al. | |
| 2003/0140087 A1 | 7/2003 | Lincoln et al. | |
| 2004/0221060 A1 | 11/2004 | Alicherry et al. | |
| 2005/0265255 A1 | 12/2005 | Kodialam et al. | |
| 2006/0271705 A1 | 11/2006 | Garcia-Luna-Aceves | |
| 2010/0146038 A1 | 6/2010 | Hajiaghayi et al. | |
| 2012/0203866 A1 * | 8/2012 | Yoo et al. | 709/219 |

* cited by examiner

*Primary Examiner* — John B. Walsh
(74) *Attorney, Agent, or Firm* — Akerman Senterfitt; Michael K. Dixon; Roy Zachariah

(57) ABSTRACT

A method includes receiving demand information from edge routers, estimating an optimal request distribution based on the demand information using a bicriteria approximation algorithm, wherein initial programming states for the estimation are specified by (u, F, D, $F_S$, $D_S$, $F_{exp}$, Fimp), where u is a current node, F is a vector representing an available facility for large capacity, D is a vector representing an outsourced large client, $F_S$ is an amount of cache server capacity offered to small clients, $D_S$ is a total demand of outsourced small clients, $F_{exp}$ is an index of a cache server being exported from a subtree, and $F_{imp}$ is an index of another cache server of another subtree that is being utilized, and providing each of the edge routers with anycast route information for the cache servers.

20 Claims, 6 Drawing Sheets

SYSTEM AND METHOD FOR ASSIGNING REQUESTS IN A CONTENT DISTRIBUTION NETWORK

CROSS REFERENCE TO RELATED APPLICATIONS

This application is a continuation of U.S. patent application Ser. No. 12/329,454, entitled "System and Method for Assigning Requests in a Content Distribution Network," filed on Dec. 5, 2008, the disclosure of which is hereby expressly incorporated by reference in its entirety.

FIELD OF THE DISCLOSURE

The present disclosure generally relates to communications networks, and more particularly relates to assigning requests in a Content Distribution Network (CDN).

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
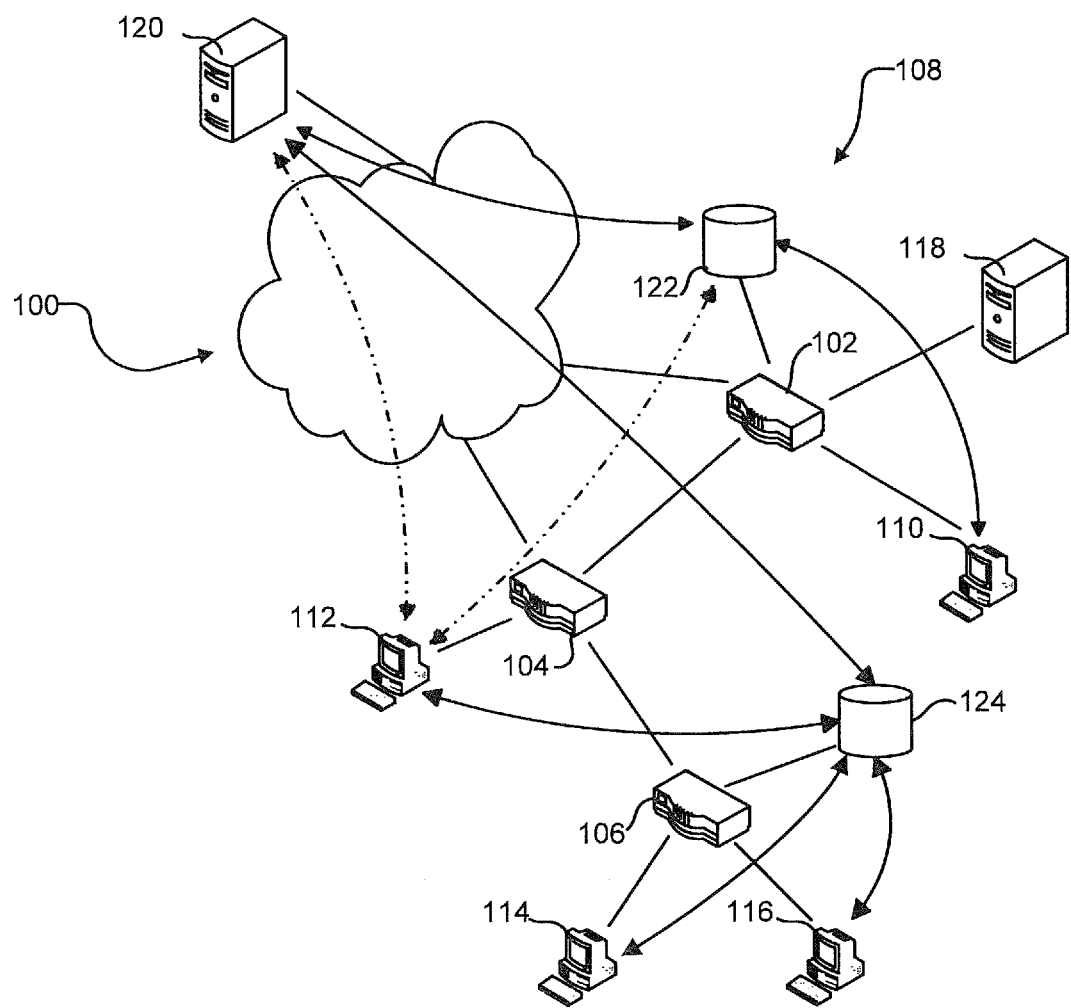
FIG. 1 is a diagram illustrating a communications network in accordance with one embodiment of the present disclosure.

FIG. 1 shows a geographically dispersed network 100, such as the Internet. Network 100 can include routers 102, 104, and 106 that communicate with each other and form an autonomous system (AS) 108. AS 108 can connect to other ASs that form network 100 through peering points at routers 102 and 104. Additionally, AS 108 can include client systems 110, 112, 114, and 116 connected to respective routers 102, 104, and 106 to access the network 100. Router 102 can provide ingress and egress for client system 110. Similarly, router 104 can provide ingress and egress for client system 112. Router 106 can provide ingress and egress for both of client systems 114 and 116.

AS 108 can further include a Domain Name System (DNS) server 118. DNS server 118 can translate a human readable hostname, such as www.att.com, into an Internet Protocol (IP) address. For example, client system 110 can send a request to resolve a hostname to DNS server 118. DNS server 118 can provide client system 110 with an IP address corresponding to the hostname. DNS server 118 may provide the IP address from a cache of hostname-IP address pairs or may request the IP address corresponding to the hostname from an authoritative DNS server for the domain to which the hostname belongs.

Client systems 110, 112, 114, and 116 can retrieve information from a server 120. For example, client system 112 can retrieve a web page provided by server 120. Additionally, client system 112 may download content files, such as graphic, audio, and video content, and program files such as software updates, from server 120. The time required for client system 112 to retrieve the information from the server 120 normally is related to the size of the file, the distance the information travels, and congestion along the route. Additionally, the load on the server 120 is related to the number of client systems 110, 112, 114, and 116 that are actively retrieving information from the server 120. As such, the resources such as processor, memory, and bandwidth available to the server 120 limit the number of client systems 110, 112, 114, and 116 that can simultaneously retrieve information from the server 120.

Additionally, the network can include cache servers 122 and 124 replicating content on the server 120 that can be located more closely within the network to the client systems 110, 112, 114, and 116. Cache server 122 can link to router 102, and cache server 124 can link to router 106. Client systems 110, 112, 114, and 116 can be assigned cache server 122 or 124 to decrease the time needed to retrieve information, such as by selecting the cache server closer to the particular client system. The network distance between a cache server and client system can be determined by network cost and access time. As such, the effective network distance between the cache server and the client system may be different from the geographic distance.

When assigning cache servers 122 and 124 to client systems 110 through 116, the cache server closest to the client can be selected. The closest cache server may be the cache server having a shortest network distance, a lowest network cost, a lowest network latency, a highest link capacity, or any combination thereof. Client system 110 can be assigned cache server 122, and client systems 114 and 116 can be assigned to cache server 124. The network costs of assigning client system 112 to either of cache server 122 or 124 may be substantially identical. When the network costs associated with the link between router 102 and router 104 are marginally lower than the network costs associated with the link between router 104 and router 106, client 112 may be assigned to cache server 124.

Client system 112 may send a request for information to cache server 124. If cache server 124 has the information stored in a cache, it can provide the information to client system 112. This can decrease the distance the information travels and reduce the time to retrieve the information. Alternatively, when cache server 124 does not have the information, it can retrieve the information from server 120 prior to providing the information to the client system 112. In an embodiment, cache server 124 may attempt to retrieve the information from cache server 122 prior to retrieving the information from server 120. The cache server 124 may retrieve the information from the server 120 only once, reducing the load on server 120 and network 100 such as, for example, when client system 114 requests the same information.

Cache server 124 can have a cache of a limited size. The addition of new content to the cache may require old content to be removed from the cache. The cache may utilize a least recently used (LRU) policy, a least frequently used (LFU) policy, or another cache policy known in the art. When the addition of relatively cold or less popular content to the cache causes relatively hot or more popular content to be removed from the cache, an additional request for the relatively hot content can increase the time required to provide the relatively hot content to the client system, such as client system 114. To maximize the cost savings and time savings of providing content from the cache, the most popular content may be stored in the cache, while less popular content is retrieved from server 120.

Figure 2:
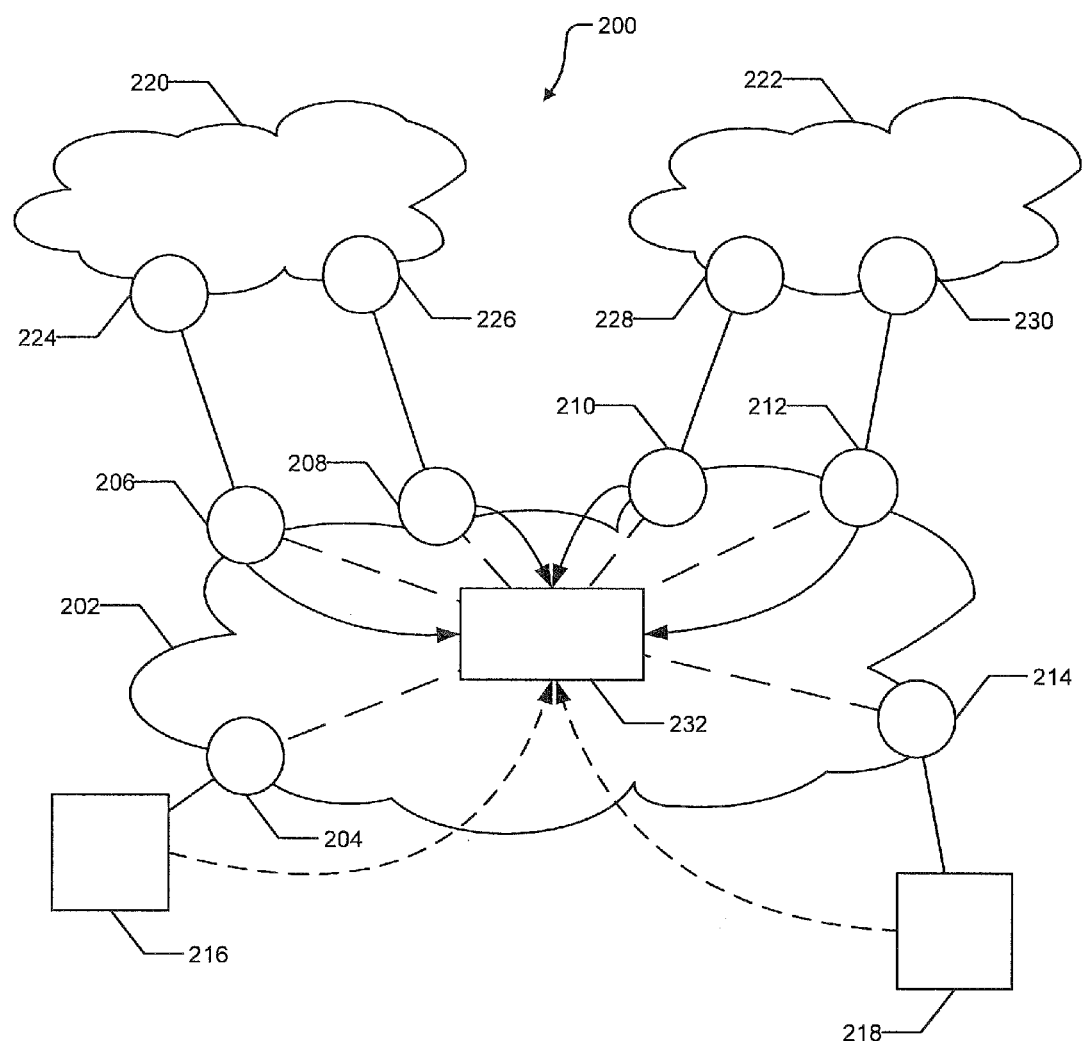
FIG. 2 is a diagram illustrating a CDN in accordance with one embodiment of the present disclosure.

FIG. 2 illustrates an anycast CDN system 200 that can be used in conjunction with communications network 100. The anycast CDN system 200 can include a CDN provider network 202. The CDN provider network 202 can include a plurality of provider edge routers 204 through 214. The provider edge routers 204 through 214 can serve as ingress points for traffic destined for the CDN provider network 202, and egress points for traffic from the CDN provider network 202 destined for the rest of the Internet. The anycast CDN system 200 can further include cache servers 216 and 218. Cache server 216 can receive traffic from the CDN provider network 202 through provider edge router 204, and cache server 218 can receive traffic from the CDN provider network 202 through edge cache router 214. In addition to providing CDN service to clients within the CDN provider network, the anycast CDN system 200 can provide CDN service to clients within AS 220 and AS 222. AS 220 can include provider edge routers 224 and 226 with peering connections to provider edge routers 206 and 208, respectively. Similarly, AS 222 can include provider edge routers 228 and 230 with peering connections to provider edge routers 210 and 212 respectively. Requests for content from systems within either AS 220 or AS 222 may enter the CDN provider network through the appropriate peering points and be directed to either cache server 216 or 218.

Each of provider edge routers 206 through 212 contributes an amount of requests per unit time. One cache server, such as cache server 216, should serve all the requests from one of the provider edge routers, such as provider edge router 206, due to the underlying IP anycast routing architecture. Additionally, there is a connection cost associated with serving requests from a provider edge router at a cache server. The connection cost is typically proportional to the distance between the cache server and the provider edge router. Generally, it is desirable to serve the requests from a provider edge router at the closest cache server. Additionally, there is a setup cost associated with serving each request. The setup cost can include the processor time involved in processing the request, the time required to retrieve content that is not cached, and the like. Further, each cache server has a server capacity for serving requests. The server capacity can be related to a processor capacity, an amount of memory, an available network bandwidth, or any combination thereof. Exceeding the server capacity can be particularly undesirable. Exceeding the server capacity of a cache server can impact the response time for a significant number of requests being served by the cache server. Accordingly, it can be desirable to serve requests from a cache server further from the provider edge router in order to avoid exceeding the server capacity of the closest cache server.

Anycast CDN system 200 can also include a route controller 232. The route controller 232 can exchange routes with provider edge routers 206 through 212 within the CDN provider network 202. As such, the route controller 232 can influence the routes selected by the provider edge routers 206 through 212. Additionally, the route controller 232 can receive load information from cache servers 216 and 218.

Cache servers 216 and 218 can advertise, such as through Border Gateway Protocol (BGP), a shared anycast address to the CDN provider network 202, specifically to provider edge routers 204 and 214. Provider edge routers 204 and 214 can advertise the anycast address to the route controller 232. The route controller 232 can provide a route to the anycast address to each of the provider edge routers 206 though 212. Provider edge routers 206 through 212 can direct traffic addressed to the anycast address to either of the cache servers 216 and 218 based on the routes provided by the route controller 232. Additionally, the provider edge routers 206 through 212 can advertise the anycast address to AS 220 and AS 222. The route controller 232 can manipulate the route provided to provider edge routers 206 through 212 based on the load on the cache servers 216 and 218, network bandwidth, network cost, network distance, or any combination thereof. Altering the route to the anycast address can change which of cache servers 216 and 218 serve content to client systems within the CDN provider network 202, AS 220, and AS 222.

In an embodiment, AS 220 may be an unstable network. Traffic from client systems within the AS 220 may enter the CDN provider network 202 at both provider edge routers 206 and 208. When anycast traffic from the same client system enters the CDN provider network 202 at both provider edge routers 206 and 208, portions of the traffic may be directed to different cache servers 216 and 218. Persistent and/or secure connections may be disrupted when portions of the traffic are sent to different cache servers 216 and 218. As such, it is undesirable to provide an anycast address to client systems within an unstable network.

Figure 3:
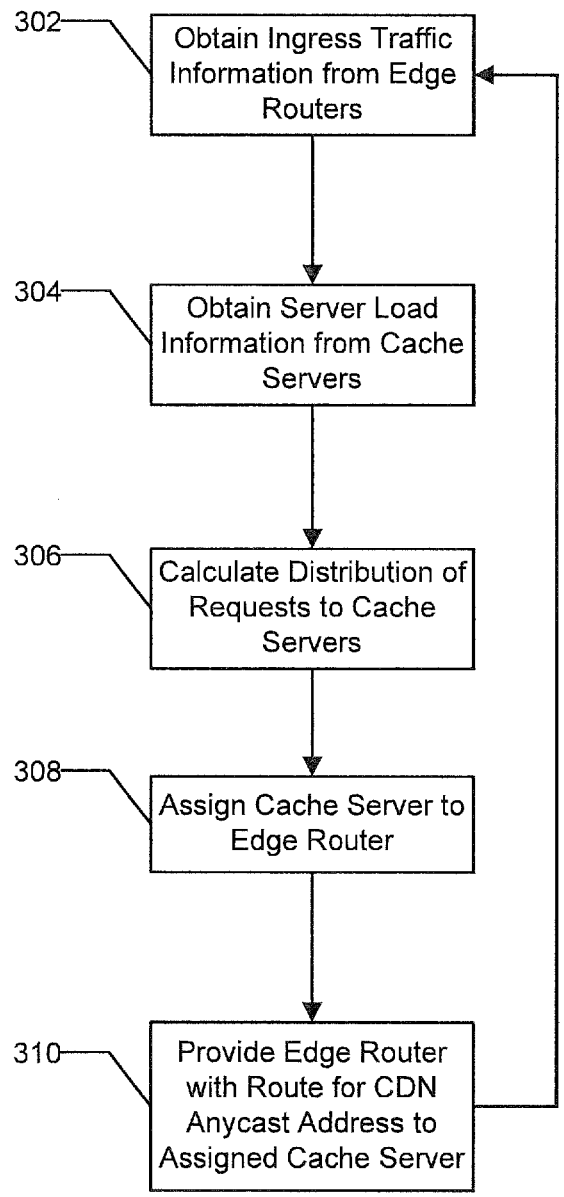
FIGS. 3-5 are flow diagrams illustrating exemplary methods of allocating requests between cache servers in accordance with embodiments of the present disclosure.

FIG. 3 illustrates an exemplary method of optimizing request distribution for a CDN network, such as CDN network 200. At 302, a request distribution system, such as route controller 232, can obtain ingress traffic information from a plurality of edge routers, such as edge routers 206 through 212. The ingress traffic information can include information about requests sent to cache servers, such as cache server 218. At 304, the request distribution system can receive server load information from the cache servers. The server load information can include processor utilization, memory utilization, a number of requests being processed, server capacity, bandwidth utilization, and the like.

In an embodiment, the edge routers can also provide outbound traffic information, including the number of responses and the bandwidth utilization of the responses. The outbound traffic information can be used in an estimate of the server capacity required to service the incoming requests.

At 306, the request distribution system can calculate an optimal distribution of the requests. The optimal distribution of requests can minimize the cost of providing content from the CDN. The cost may include server cost, network cost, time to first byte of the content, time to deliver the content, and the like. Additionally, the optimal distribution of requests may reduce the likelihood of overloading any one of the cache servers. At 308, the request distribution system can assign a cache server to each of the edge routers. In an embodiment, a cache server can be assigned to more than one edge router. At 310, the request distribution system can provide each edge router with a route for a CDN anycast address. The route can deliver the requests associated with an edge router to the assigned cache server.

In an alternate embodiment, the request distribution system may obtain ingress information based on the distribution of DNS requests for an IP address of a cache server and information regarding the server capacity required to service the content requests associated with each DNS request. For example, a DNS request for a cache server can come from an Internet Service Provider (ISP) DNS server. Information about the number of content requests and the server capacity required to service those content requests can indicate the amount of server capacity that can be required to service requests associated with the ISP DNS server. Further, the request distribution system may use optimal distribution of requests to assign each DNS request to one or more cache servers.

Figure 4:
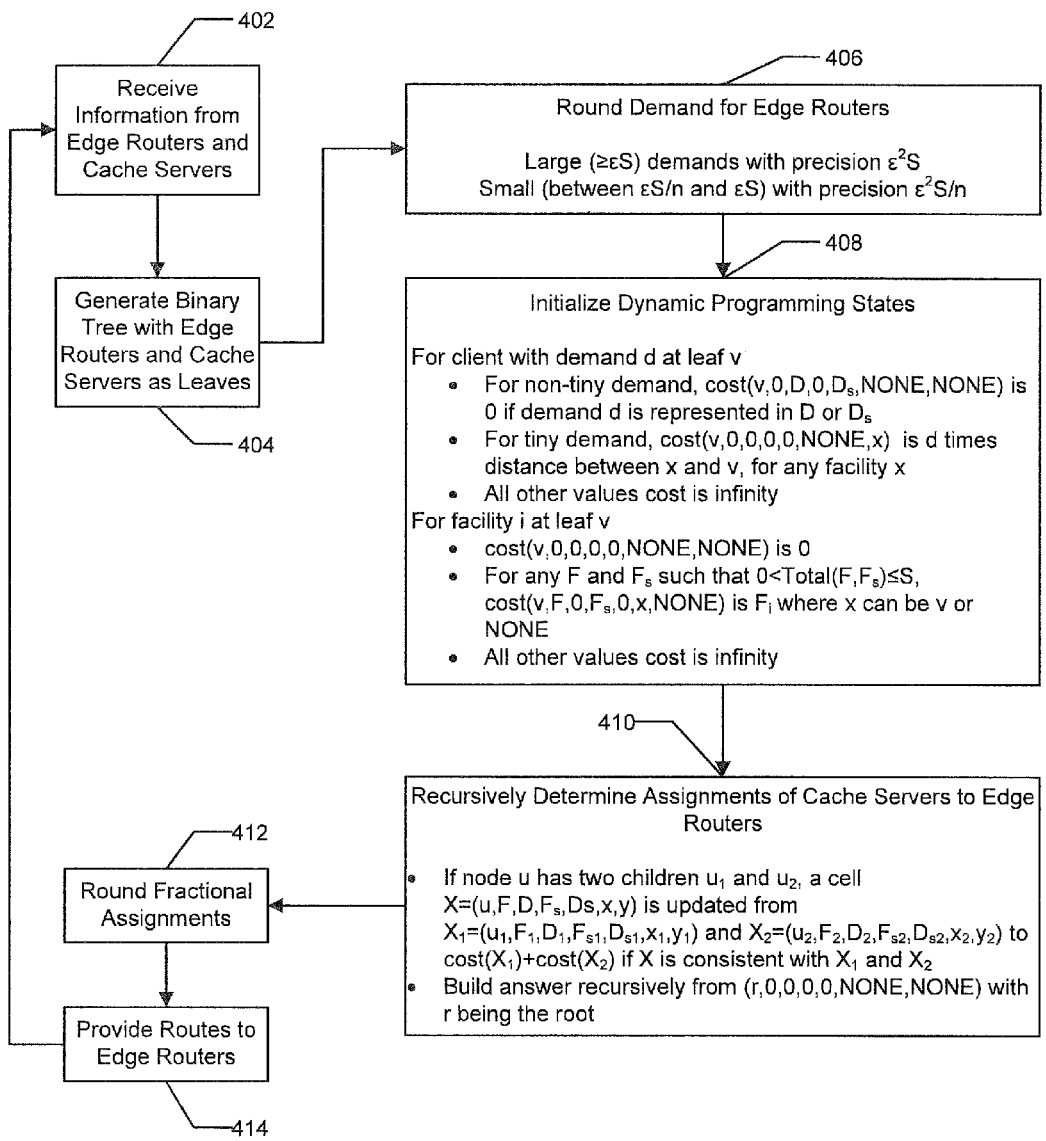

FIG. 4 illustrates an exemplary method of using a bicriteria $(\alpha, \beta)$-approximation algorithm for optimizing request distribution for a CDN network. The bicriteria $(\alpha, \beta)$-approximation algorithm can be a polynomial time algorithm that produces a solution having a cost of at most $\alpha$ times the optimum while violating the capacities by not more than a factor of $\beta$. For example, the cost may be at most log n times the optimum and the capacities can be exceeded by not more than c times the capacity, where n is the number of edge routers and s is a small fraction.

In an embodiment, the server capacities of all the cache servers can be substantially similar and can be approximated by a single value S. For example, the bandwidth available to each cache server can be the same. Each cache server can exceed the server capacity S by not greater than $S\epsilon$. In practice, the server capacities S can be defined such that the true server capacity is $S(1+\epsilon)$, so that an edge server does not become overloaded. It can be desirable for $\epsilon$ to remain small, such that the over provisioning of each cache server can be small. For example, c can be not greater than 0.1, such as not greater than 0.05, or even not greater than 0.01.

At 402, a request distribution system can receive demand information from the edge routers. In a particular case, all the edge routers can have demands that are larger than $\epsilon S$. In this case, a cache server should not be assigned to more than $1/\epsilon$ edge routers. As such, $\epsilon$ should be less than the number of cache servers divided by the number of edge routers.

In a more general case, edge routers can have a small demand, such as between $\epsilon S$ and $\epsilon S/n$, such that n small edge routers can be assigned to a particulate cache server. Treating the small edge routers separately increases the number of choices, making the running time exponential. Accordingly, during the assignment of the cache servers to the edge routers, edge routers with a small demand can be combined to create a virtual edge router with a large demand. There may be multiple virtual edge routers formed from different sets of edge routers with small demands. Additionally, other edge routers may have a tiny demand, less than $\epsilon S/n$. These edge routers may be assigned to the closest cache server, as the demand may be assumed to be too small to significantly violate the capacity constraint, even when assigned to a fully utilized cache server.

At 404, the request distribution system can generate a tree with the edge routers and the cache servers as leaves. In an embodiment, the general metrics can be probabilistically embedded into tree metrics resulting in a O(log n) approximation algorithm for general metrics. For example, this can be accomplished using the method of Bartal (Proceedings of the 30th Annual ACM Symposium on Theory of Computing, pages 161-168, 1998, the disclosure of which is incorporated herein by reference) or Fakcharoenphol et al. (J. Comput. Syst. Sci., 69(3), pages 485-497, 2004, the disclosure of which is incorporated herein by reference). The binary tree can further include a root node, and a number of intermediate nodes that are root nodes of a subtree. A partial solution can be determined for a particular subtree rooted at an intermediate node. In a partial solution, not all edge routers of the substree may be handled within the subtree and their demands can be outsourced to another subtree. Similarly, not all cache servers may be fully utilized within a subtree and may offer their capacity to edge routers outside of the subtree. The complete solution at the root node can be required to have no outsourced demands.

At 406, the demand for each edge router can be rounded. For example, edge routers with large demands, at least $\epsilon S$, can be rounded down to the closest multiple of $\epsilon^2 S$. This results in a polynomial number of demand sizes as required for a polynomial time algorithm. Edge routers with small demands, between $\epsilon S/n$ and $\epsilon S$, can be rounded down to the closest multiple of $\epsilon^2 S/n$, such that the small demands can be combined into a large demand.

At 408, the dynamic programming states can be initialized. For an intermediate or root node, a dynamic programming state can be specified by (u, F, D, $F_s$, $D_s$, $F_{exp}$, $F_{imp}$), where u is the current node, F is a vector representing the available facilities for large capacities, D is a vector representing the outsourced, or unsatisfied, large clients, $F_s$ is the amount of the cache server capacities offered to small clients (a multiple of $\epsilon^2 S/n$), $D_s$ is the total demand of outsourced small clients (a multiple of $\epsilon^2 S/n$), $F_{exp}$ is the index of the cache server being exported from this subtree, and $F_{imp}$ is the index of a cache server of another subtree that is being utilized. $F_{exp}$ and $F_{imp}$ can take the value "NONE". For leaves representing edge routers, the initial state is (v, 0, D, 0, $D_s$, "NONE", "NONE") and the cost can be set to zero if the demand is represented in D or $D_s$. For leaves representing the cache servers, the initial state is (v, 0, 0, 0, 0, "NONE", "NONE"). For any F and $F_s$ such that the total of F and $F_s$, Total(F, $F_s$) is greater than zero and not greater than S, that is 0<Total(F, $F_s$)≤S, the cost can be the setup cost $F_i$ of the cache server.

At 410, the assignments of cache servers to edge routers can be recursively determined. For example, the values of the nodes can be updated from the leaves towards the root. The cost at a node can be the cost of the dynamic programming state plus the cost of moving outsourced clients in D and $D_s$ and the offered facilities in F and $F_s$ to the next higher node. When the state of the child nodes is consistent, the parent node can be the sum of the child nodes if the sum is better than the current state, that is when the sum of the costs of the children is better than the current lowest cost for the parent.

In an embodiment, the child nodes are consistent when several criteria are met. First, the sum of the available facilities for large demands of the child nodes should be less than the sum of the large demands of the child nodes. That is, $F_1+F_2-F=D_1+D_2-D\geq 0$ where $F_1$ and $F_2$ are the available capacities of the children for large demands, F is the available capacity of the parent for large demands, $D_1$ and $D_2$ are the outsourced demands of the children for large demands, and D is outsourced demand of the parent for large demands. Additionally, the sum of the available facilities for small demands of the child nodes should be less than the sum of the small demands of the child nodes. That is, $F_{s1}+F_{s2}-F_s=D_{s1}+D_{s2}-D_s\geq 0$, where $F_{s1}$ and $F_{s2}$ are the available capacities of the children for small demands, $F_s$ is the available capacity of the parent for small demands, $D_{s1}$ and $D_{s2}$ are the outsourced demands of the children for small demands, and $D_s$ is outsourced demand of the parent for small demands. These first two conditions can ensure that the demand ignored at the parent is actually matched to facilities of the same size.

Further, only one exported node $F_{exp}$ and one imported node $F_{imp}$ from the child subtrees should be outside of the parent subtree. For example, if a first child does not have an exported node ($F_{exp}$="NONE") and the second child has an exported node, then the parent would have the exported node of the second child. In another example, if the imported node from the first child is the same as the exported node of the second child, then the parent can import the imported node of the second child because the imported node of the first child is within the subtree of the parent. Specifically, $y_1=x_2$ or $y_1=y$ or $y_1$="NONE", and $y_2=x_1$ or $y_2=y$ or $y_2$="NONE", where $x_1$ and $x_2$ are the indices of the exported facilities for the children, $y_1$ and $y_2$ are the indices of the imported facilities for the children, and y is the index for the imported facility for the parent. The two conditions can ensure that what is requested by a subtree is provided for or put on the request list of the parent. Additionally, $x=x_1$ or $x=x_2$ or x="NONE", where x is the index for the exported facility for the parent. This condition can prevent the parent from exporting a facility that is not available. Once the states have been updated and the root node has a consistent low cost state that satisfies all the demands of the edge routers, then the assignments can be determined recursively from the root node.

At 412, fractional assignments can be adjusted. Due to the grouping of the small demands, a small demand from an edge router could be assigned to multiple cache servers. To accommodate the underlying anycast architecture, a single cache server should handle the demand from any single edge router. Any fractional assignments of small demands can be adjusted accordingly. This can be done, for example, using the algorithm of Shmoys and Tardos (Math. Programming, 62(3, Ser. A), pages 461-474, 1993, the disclosure of which is incorporated herein by reference).

At 414, the request distribution system can provide the route information to the edge routers. From the assignments of the cache servers to the edge routers, the system can determine routes from each edge router to the assigned cache server. The topology of the network, including locations of any internal routers, can be incorporated into the routes so that routes to different cache servers do not cross the same internal router. The route information, including the next hop for packets to the anycast address of the cache servers, can be sent to each of the edge routers and internal routers. The system can return to 402 to receive additional demand information from the edge routers.

Figure 5:
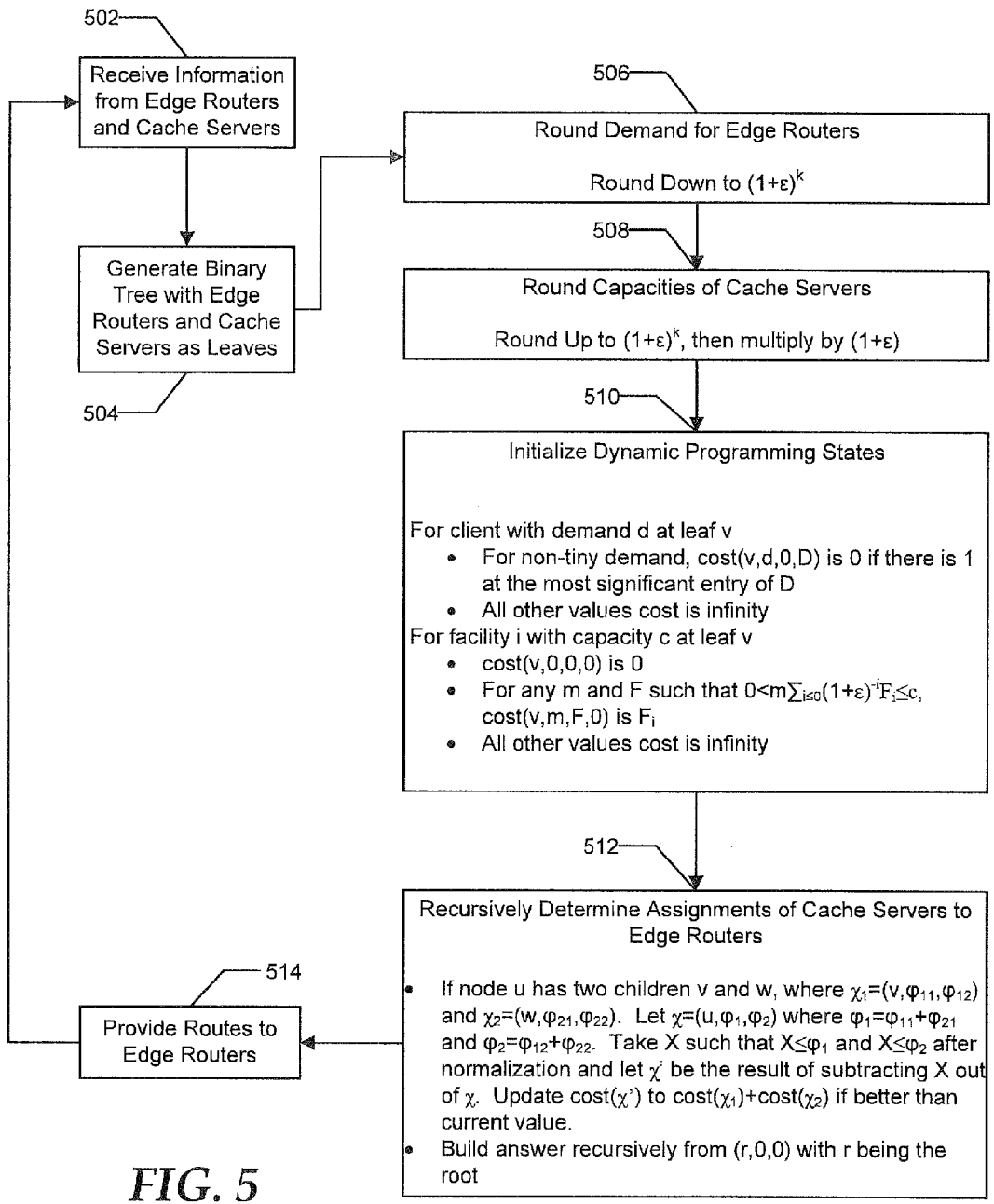

FIG. 5 illustrates another exemplary method of using a bicriteria ($\alpha$, $\beta$)-approximation algorithm for optimizing request distribution for a CDN network. In an embodiment, the server capacities of all the cache servers may not be the same. For example, the cache servers may have different processor capacities, different amounts of memory, or different available bandwidths. In this case, the identification of small demands can be relative to the server to which the demand is assigned. As small demands and large demands were treated separately in the previously described uniform capacity case, accommodating the changes in the type of demand for the edge router based on the assigned cache server can result in a non-polynomial algorithm. However, when all demands are treated as either large demands (significant demands to be allocated) or tiny demands (insignificant demands that can be assigned to the closest cache server), a polynomial time algorithm can be achieved.

At 502, a request distribution system can receive demand information from edge routers and capacity information from cache servers. At 504, the request distribution system can generate a binary tree with the edge routers and the cache servers as leaves. At 506, the demand from each edge router can be rounded, and at 508, the capacity of each cache server can be rounded. For example, the demand can be rounded down to the closest $(1+\epsilon)^k$ and the capacities can be rounded up to the closest $(1+\epsilon)^k$, where k is an integer. This results in a polynomial number of capacity sizes and demand sizes, as required for the polynomial time algorithm.

At 510, the dynamic programming states can be initialized. Because there are no small demands, the dynamic programming state can be specified by (u, base, F, D), where u is the current node, base is the largest capacity or demand in F or D, F is a vector of logarithmic length representing the available facilities of different sizes, and D is a vector of logarithmic length representing the outsourced, or unsatisfied, edge routers of different sizes. The span of F and D can be a multiplicative range of $\epsilon/n$ and having a length of $\log_{1+\epsilon}(n/\epsilon)$. Additionally, unless F=D=0, one of them has a nonzero value in its most signification entry and can be stored in a normalized fashion. At 512, the assignments of cache servers to edge routers can be recursively determined. At 514, the request distribution system can provide the route information to the edge routers. The system can return to 502 to receive additional information from the edge routers and cache servers.

Figure 6:
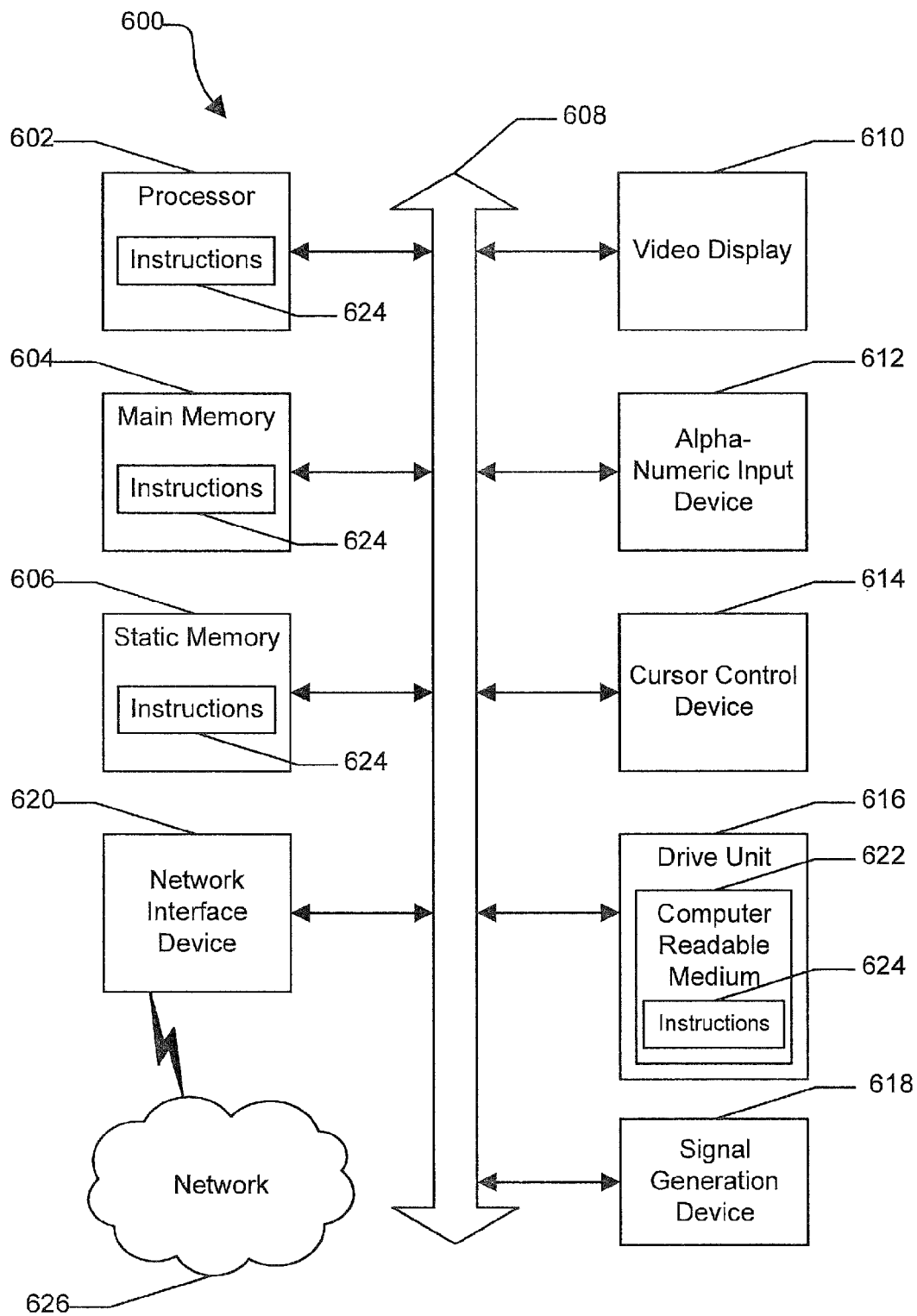
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. Alternatively, input device 612 and cursor control device 614 can be combined in a touchpad or touch sensitive screen. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   receiving, at a route controller, demand information from a plurality of edge routers that direct requests from a client system to one of a plurality of cache servers, wherein each of the cache servers provides content to the client system in response to the requests;
   estimating an optimal request distribution based on the demand information using a bicriteria approximation algorithm, wherein initial programming states for the estimation are specified by (u, F, D, $F_s$, $D_s$, $F_{exp}$, Fimp), where u is a current node, F is a vector representing an available facility for large capacity, D is a vector representing an outsourced large client, $F_s$ is an amount of cache server capacity offered to small clients, $D_s$ is a total demand of outsourced small clients, $F_{exp}$ is an index of a cache server being exported from a subtree, and $F_{imp}$ is an index of another cache server of another subtree that is being utilized; and
   providing each of the edge routers with anycast route information for the cache servers.

2. The method of claim 1, wherein the demand information includes a number of requests per unit time.

3. The method of claim 1, wherein each of the plurality of cache servers has a server capacity.

4. The method of claim 3, wherein the route controller receives server capacity information from the plurality of cache servers.

5. The method of claim 4, wherein the optimal request distribution is further based on the server capacity information.

6. The method of claim 1, wherein in estimating the optimal request distribution, the method further comprising:
   initializing the initial programming states;
   recursively determining assignments of the cache servers to the edge routers; and
   rounding fractional assignments.

7. The method of claim 1, further comprising:
   rounding the demand information;
   wherein estimating the optimal request distribution is in response to rounding the demand information, and is based on the rounded demand information.

8. A method comprising:
   receiving, at a route controller, demand information from a plurality of edge routers that direct requests from a client system to one of a plurality of cache servers, wherein each of the cache servers provides content to a client system in response to the requests;
   dividing the edge routers into edge routers with large demands and edge routers with small demands;
   combining a number of edge routers with small demands into a virtual large demand router;
   using dynamic programming to recursively assign each cache server to an edge router;
   determining route information based on the edge router assigned to each cache server; and
   providing each of the edge routers with route information.

9. The method of claim 8, wherein the demand information includes a number of requests per unit time.

10. The method of claim 8, wherein each of the plurality of cache servers has a server capacity.

11. The method of claim 10, wherein the route controller receives server capacity information from the plurality of cache servers.

12. The method of claim 11, wherein the optimal request distribution is further based on the server capacity information.

13. The method of claim 8, further comprising:
rounding the demand information;
wherein dividing the edge routers into edge routers with large demands and edge routers with small demands is in response to rounding the demand information, and is based on the rounded demand information.

14. A route controller comprising:
a processor; and
a storage medium storing instructions that, when executed by the processor, cause the processor to perform operations comprising:
receiving demand information from a plurality of edge routers that direct requests from a client system to one of a plurality of cache servers, wherein each of the cache servers provides content to the client system in response to the requests;
estimating an optimal request distribution based on the demand information using a bicriteria approximation algorithm, wherein initial programming states for the estimation are specified by (u, F, D, $F_s$, $D_s$, $F_{exp}$, Fimp), where u is a current node, F is a vector representing an available facility for large capacity, D is a vector representing an outsourced large client, $F_s$ is an amount of cache server capacity offered to small clients, $D_s$ is a total demand of outsourced small clients, $F_{exp}$ is an index of a cache server being exported from a subtree, and $F_{imp}$ is an index of another cache server of another subtree that is being utilized; and
providing each of the edge routers with anycast route information for the cache servers.

15. The route controller of claim 14, wherein the demand information includes a number of requests per unit time.

16. The route controller of claim 14, wherein each of the plurality of cache servers has a server capacity.

17. The route controller of claim 16, wherein the operations further comprise receiving server capacity information from the plurality of cache servers.

18. The route controller of claim 17, wherein the optimal request distribution is further based on the server capacity information.

19. The route controller of claim 14, wherein in estimating the optimal request distribution, the operations further comprise:
initializing the initial programming states;
recursively determining assignments of the cache servers to the edge routers; and
rounding fractional assignments.

20. The route controller of claim 14, wherein the operations further comprise rounding the demand information, wherein estimating the optimal request distribution is in response to rounding the demand information, and is based on the rounded demand information.

* * * * *